Patented June 24, 1947

2,422,927

UNITED STATES PATENT OFFICE 2,422,927

MANUFACTURE OF ARTIFICIALLY COLORED GRANULES

Frank P. Reynolds, East Walpole, Mass., assignor to Bird & Son, inc., East Walpole, Mass., a corporation of Massachusetts No Drawing. Application January 27, 1945, Serial No. 574,967

7 Claims. (Cl. 117—100)

This invention relates to the manufacture of artificially colored granules and has to do principally with the provision of such granules for use in making mineral surfaced roofing, though such granules are useful for various other purposes. The invention relates particularly to an improvement upon the method of Patent No. 2,001,448, to Milton R. Beasley, to the end that the granule product as described therein is more efficiently, economically, and uniformly produced. The granules of this invention, like those of the Beasley patent, are substantially free from water-soluble salts of sodium, and have a durable, insoluble, silicate bonded exterior coating of uniform coverage and color. Such coating may be applied in practice to a large variety of granule base materials as hereinafter set forth, and even though the base granules, fillers or pigments be slightly reactive to sodium silicate.

The improved method of this invention of manufacture of colored granules with their insoluble coating is as follows: there is first provided as a base for the colored granules, particles of material, whether natural or artificial, sufficiently heat resistant to withstand the heat incident to a forming of a continuous coating thereon. There may be employed, for example, particles of sand, rock, gravel, blast-furnace slags, or burned clay or shale, including crushed brick or the like.

In the preferred practice of the process there are mixed together a hydrous plastic clay (preferably in dry condition), coloring and/or filler pigments, and substantially dry powdered silicate of soda, as distinguished from a silicate of soda solution. The order of adding or mixing together of these constituents is unimportant. The silicate of soda preferred in this method is one having a ratio of $Na_2O$ to $SiO_2$ of 1:3.22, for example, that known commercially as "G" brand. This powdered silicate averages preferably 19.4% $Na_2O$ and 62.5% $SiO_2$, the remainder averaging 17.5% of water of constitution. Proportions which have been found entirely suitable in the preferred practice of the invention are as follows:

| | Parts by weight, pounds |
|---|---|
| Granule base material | 1951.2 |
| Hydrous plastic clay | 40.7 |
| Color pigment (e. g. red iron oxide) | 13.0 |
| Powdered silicate of soda (e. g. "G" brand) | 21.6 |

In accordance with the preferred procedure, the particles of granule base material are mixed in a rotating mixer with the other dry ingredients, just referred to, until the granules are uniformly coated, which will require about 3 to 4 minutes. Low pressure steam, up to say, 100 lbs. pressure, is then admitted to the mixer for approximately 1 to 2 minutes while the mixer continues to revolve. The steam, together with the tumbling action of the mixer, partially dissolves the powdered silicate and with the heating in the kiln produces a strongly-bonded pigmented silicate coating on the granules. The steam is then shut off and the mixing continued for about 2 minutes, or until the moistened granules are uniformly coated. The granules thus coated are then transferred to a drier or kiln and heated at a temperature of 700° to 1000° F. to dehydrate and insolubilize the silicate and to produce the desired weather-resistant coating. Preferably, the slight amount of water required is added in the form of steam vapor, though it may be added otherwise. Though the preferred kiln temperatures are as stated, the temperature employed may range from say, 450° to 1200° F. If desired, the pigment may be omitted so as to provide a granule base material with a clear or translucent coating. Also, there may be employed fillers of low refractive index such as finely divided silica, barytes, whiting, asbestine, talc, or others used in the paint industry, and these may be added to the table of proportions as above set forth, or substituted for a part of the clay. These fillers, if employed, should be alkali resistant.

While, in general, metallic oxides are preferable as coloring pigments, other coloring pigments which are sufficiently alkali and heat-resistant may be used, according to the temperatures employed In practice, as already mentioned, a more reactive base granule, pigment, or filler may be employed than when liquid silicate of soda is used as set forth in the said Beasley patent. Silicate of soda is much more reactive in solution than in the comparatively dry state in which it is employed in this invention. As a result, liquid silicate of soda tends to gel to some extent before an even coating of the silicate around the individual granules can be obtained. When powdered silicate of soda is used, however, sufficient time is afforded so that the even distribution of the silicate can be obtained even though the base granules, filler, or pigment be slightly reactive in that the granules are first coated (and uniformly) with the powdered silicate before moisture (e. g. steam vapor) is introduced into the mixture. Therefore, even though the slight gelling may thus occur, the gel is around the individual—and already uniformly coated—granules so that it is possible to maintain and harden the uniform coating thus provided.

From the foregoing it will be seen that I have provided an improved method which permits the use of a wide range of cheap base materials and provides a more uniform coating, whether or not more reactive base materials be employed. Also, very much less heat is required since there is relatively little liquid to be driven off, only that from the condensation of the steam and vapor and water of constitution of dry silicate of soda. In this way, a very substantial fuel saving is secured as well as a substantial saving in finished granule cost due to shipping and handling the dry silicate of soda as compared with a silicate of soda solution since the latter necessitates the expense of solubilizing the silicate and transporting the water (in the silicate solution) from the solubilizing plant to the plant where the granules are manufactured.

Having described my invention, I claim:

1. The method of coating roofing granules which includes mixing particles of a refractory granule base with substantially dry hydrous plastic clay and substantially dry powdered silicate of soda, adding to the mixture a small amount of water, and heating said granules to a temperature sufficiently high to react the hydrous plastic clay and silicate of soda in situ inter se thereby producing on said particles an insoluble exterior weather-resistant coating.

2. The method of coating roofing granules which includes mixing particles of a refractory granule base with substantially dry hydrous plastic clay, pigment, and substantially dry powdered silicate of soda, adding to the mixture a small amount of water, and heating said granules to a temperature sufficiently high to react the hydrous plastic clay and silicate of soda in situ inter se thereby producing on said particles an insoluble exterior weather-resistant coating.

3. The method of coating roofing granules which includes mixing particles of a refractory granule base with substantially dry hydrous plastic clay and substantially dry powdered silicate of soda, steaming the granules thus coated, and heating said granules to a temperature sufficiently high to react the hydrous plastic clay and silicate of soda in situ inter se thereby producing on said particles an insoluble exterior weather-resistant coating.

4. The method of coating roofing granules which includes mixing particles of a refractory granule base with substantially dry hydrous plastic clay, pigment, and substantially dry powdered silicate of soda, steaming the granules thus coated, and heating said granules to a temperature sufficiently high to react the hydrous plastic clay and silicate of soda in situ inter se thereby producing on said particles an insoluble exterior weather-resistant coating.

5. The method of coating roofing granules which includes mixing particles of a refractory granule base with substantially dry hydrous plastic clay and substantially dry powdered silicate of soda, adding to the mixture a small amount of water in finely divided form, and heating said granules to a temperature sufficiently high to react the hydrous plastic clay and silicate of soda in situ inter se thereby producing on said particles an insoluble exterior weather-resistant coating.

6. The method of coating roofing granules which includes mixing particles of a refractory granule base with substantially dry hydrous plastic clay, pigment, and substantially dry powdered silicate of soda, adding to the mixture a small amount of water in finely divided form, and heating said granules to a temperature sufficiently high to react the hydrous plastic clay and silicate of soda in situ inter se thereby producing on said particles an insoluble exterior weather-resistant coating.

7. The method of coating roofing granules which includes mixing particles of a refractory granule base with substantially dry hydrous plastic clay, coloring and non-coloring filler pigment and substantially dry powdered silicate of soda, adding to the mixture a small amount of water, and heating said granules to a temperature sufficiently high to react the hydrous plastic clay and silicate of soda in situ inter se thereby producing on said particles an insoluble exterior weather-resistant coating.

FRANK P. REYNOLDS.

REFERENCES CITED

The following references are of record in the file of this patent:

UNITED STATES PATENTS

| Number | Name | Date |
| --- | --- | --- |
| 1,555,086 | Tilton et al. | Sept. 29, 1925 |
| 2,001,448 | Beasley | May 14, 1935 |
| 2,379,358 | Jewett | June 26, 1945 |